(12) United States Patent
Mrozinski (10) Patent No.: US 8,182,908 B2
(45) Date of Patent: May 22, 2012

(54) MICROPOROUS MEMBRANES HAVING A RELATIVELY LARGE AVERAGE PORE SIZE AND THE METHODS OF MAKING THE SAME

(75) Inventor: James S. Mrozinski, Oakdale, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 186 days.

(21) Appl. No.: 12/680,592

(22) PCT Filed: Sep. 24, 2008

(86) PCT No.: PCT/US2008/077458
§ 371 (c)(1),
(2), (4) Date: Mar. 29, 2010

(87) PCT Pub. No.: WO2009/048743
PCT Pub. Date: Apr. 16, 2009

(65) Prior Publication Data
US 2010/0221522 A1    Sep. 2, 2010

Related U.S. Application Data

(60) Provisional application No. 60/979,160, filed on Oct. 11, 2007.

(51) Int. Cl.
B32B 3/26 (2006.01)
B32B 25/16 (2006.01)
B29C 55/02 (2006.01)

(52) U.S. Cl. .............. 428/315.5; 428/315.7; 428/316.6; 521/145; 264/173.13; 264/173.15

(58) Field of Classification Search .............. 428/315.5, 428/315.7, 316.6; 521/145; 264/173.13, 264/173.15
See application file for complete search history.

(56) References Cited

U.S. PATENT DOCUMENTS

| | | |
|---|---|---|
| 4,539,256 A | 9/1985 | Shipman |
| 4,618,533 A | 10/1986 | Steuck |
| 4,726,989 A | 2/1988 | Mrozinski |
| 5,120,594 A | 6/1992 | Mrozinski |
| 5,370,889 A | 12/1994 | Fortuin et al. |
| 5,376,445 A | 12/1994 | Fortuin et al. |
| 5,503,791 A | 4/1996 | Fortuin et al. |
| 5,976,686 A | 11/1999 | Kaytor et al. |
| 6,110,309 A | 8/2000 | Wang et al. |
| 6,126,826 A | 10/2000 | Pacheco et al. |
| 6,632,850 B2 | 10/2003 | Hughes et al. |
| 2005/0058821 A1 | 3/2005 | Smith et al. |
| 2006/0148915 A1* | 7/2006 | Floyd et al. ............. 521/61 |
| 2007/0154703 A1 | 7/2007 | Waller et al. |

* cited by examiner

Primary Examiner — Hai Vo
(74) Attorney, Agent, or Firm — Daniel R. Pastirik; James A. Baker (57) ABSTRACT

Microporous membranes having a relatively large average pore size, methods of making microporous membranes having a relatively large average pore size, and methods of using microporous membranes having a relatively large average pore size are disclosed.

22 Claims, 3 Drawing Sheets

MICROPOROUS MEMBRANES HAVING A RELATIVELY LARGE AVERAGE PORE SIZE AND THE METHODS OF MAKING THE SAME

CROSS-REFERENCE TO RELATED APPLICATIONS

The present application claims the benefit of U.S. Provisional Application No. 60/979,160, filed on Oct. 11, 2007.

TECHNICAL FIELD

The present disclosure relates to microporous membranes having a relatively large average pore size and methods of making microporous membranes having a relatively large average pore size.

BACKGROUND

There is a need in the art for microporous membranes having a relatively large average pore size. Further, there is a need in the art for methods of making microporous membranes having a relatively large average pore size.

SUMMARY OF THE INVENTION

The present invention is directed to microporous membranes having a relatively large average pore size, in particular, an average pore size of greater than about 2.0 micrometers (μm) and in some embodiments from about 3.0 μm to about 15.0 μm. The microporous membranes of the present invention may be used alone as a single layer or may be combined with one or more additional layers to form multi-layered articles.

In one exemplary embodiment of the present invention, the microporous membrane comprises a first layer comprising a poly(vinylidene fluoride) polymeric spherulitic matrix and a nucleating agent substantially uniformly dispersed throughout the poly(vinylidene fluoride) polymeric spherulitic matrix, wherein the nucleating agent comprises bicyclo[2.2.1]heptane-2,3-dicarboxylic acid, disodium salt. The first layer may further comprise a diluent substantially uniformly dispersed throughout the poly(vinylidene fluoride) polymeric matrix.

In another exemplary embodiment of the present invention, the microporous membrane comprises a first layer comprising a poly(vinylidene fluoride) polymeric matrix and a nucleating agent substantially uniformly dispersed throughout the polymeric matrix, the nucleating agent comprising bicyclo[2.2.1]heptane-2,3-dicarboxylic acid, disodium salt, wherein the first layer has a substantially uniform distribution of pores therein, the pores having an average pore size greater than about 2.0 micrometers (μm) and in some embodiments ranging from about 3.0 μm to about 15.0 μm.

The present invention is further directed to multi-layered articles comprising two or more distinct layers, wherein at least one layer comprises a microporous membrane. In one exemplary embodiment of the present invention, the multi-layered article comprises a first layer comprising a poly(vinylidene fluoride) polymeric matrix and a nucleating agent substantially uniformly dispersed throughout the poly(vinylidene fluoride) polymeric matrix, the nucleating agent comprising bicyclo[2.2.1]heptane-2,3-dicarboxylic acid, disodium salt, wherein the first layer has a substantially uniform distribution of first layer pores therein, the first layer pores having an average pore size greater than about 2.0 micrometers (μm) and in some embodiments ranging from about 3.0 μm to about 15.0 μm; and a second layer on an outer surface of the first layer. The second layer may comprise a variety of materials such as an adhesive layer, a coating composition, a polymeric film or metal foil layer, a fabric layer (e.g., a woven, nonwoven or knitted fabric layer), another microporous membrane layer, or any combination thereof.

In another exemplary embodiment of the present invention, the multi-layered article comprises a first layer comprising a poly(vinylidene fluoride) polymeric spherulitic matrix and a nucleating agent substantially uniformly dispersed throughout the poly(vinylidene fluoride) polymeric spherulitic matrix, the first layer having a substantially uniform distribution of pores in-between the spherulites therein with the pores having an average pore size greater than about 2.0 micrometers (μm) and in some embodiments ranging from about 3.0 μm to about 15.0 μm; and a second layer on at least one major outer surface of the first layer, the second layer comprising a second polymeric matrix having a substantially uniform distribution of second layer pores therein, the second layer pores having an average pore size less than the first layer pores and ranging from about 0.05 μm to less than about 15.0 μm.

The present invention is further directed to methods of making microporous membranes. In one exemplary method of making a microporous membrane, the method comprises forming a first layer of a poly(vinylidene fluoride) polymeric spherulitic matrix and a nucleating agent substantially uniformly dispersed throughout the poly(vinylidene fluoride) polymeric spherulitic matrix, the first layer having a substantially uniform distribution of pores in-between the spherulites therein with the pores having an average pore size greater than about 2.0 micrometers (μm) and in some embodiments ranging from about 3.0 μm to about 15.0 μm.

The microporous membranes and multi-layer articles of the present invention are suitable for use in a variety of applications including, but not limited to, microfiltration, particle filtration (e.g., red blood cells and yeast), and fuel cell applications.

These and other features and advantages of the present invention will become apparent after a review of the following detailed description of the disclosed embodiments and the appended claims.

BRIEF DESCRIPTION OF THE DRAWINGS

The present invention is further described with reference to the appended figures, wherein.

DETAILED DESCRIPTION OF THE INVENTION

Although the present invention is herein described in terms of specific embodiments, it will be readily apparent to those skilled in this art that various modifications, rearrangements, and substitutions can be made without departing from the spirit of the invention. The scope of the present invention is thus only limited by the claims appended hereto.

The present invention is directed to various improvements in microporous materials and methods. The articles and materials of the present invention have a microporous structure characterized by a multiplicity of spaced (i.e., separated from one another), randomly dispersed domains of polymer (referred to herein as "spherulites") connected by fibrils and a nucleating agent uniformly dispersed within the polymer matrix. This structure provides for advantageous porosity, strength, and stretchability of the microporous materials.

Various terms are used in the specification and claims herein that may require explanation beyond their generally understood meanings.

Thus, it will be understood that, when referring to a polymer as being "crystallized," this means that the polymer is at least partially crystalline.

It will be further understood that the term "thermoplastic polymer" refers to conventional polymers that are melt processable under ordinary melt processing conditions. The term "thermoplastic polymer" is not intended to include polymers that may be thermoplastic, but are rendered melt processable only under extreme conditions.

The term "diluent" refers to a material that (1) is mixable with a polymeric material, (2) is able to form a solution with a polymeric material when the mixture is heated above the melt temperature of the polymeric material, and (3) phase separates from that solution when the solution is cooled below the crystallization temperature of the polymeric material.

The term "melting temperature" refers to the temperature at which the material, whether the polymer, diluent, or combination thereof, will melt.

The term "crystallization temperature" refers to the temperature at which the polymer, when present with diluent in the blend, will crystallize.

The term "melting point" refers to the commonly accepted melting temperature of the pure polymer, as may be available in published references.

I. Microporous Membranes

The present invention provides microporous polymeric membranes suitable for a variety of applications. The present invention applies the process of Thermally Induced Phase Separation (TIPS) to a blend of a polymer, a nucleating agent and a diluent to form microporous polymeric membranes. Microporous membranes produced from the blend using thermally induced phase separation (TIPS) processes can be customized to have a range of microporous properties including an average pore size greater than about 2 μm, in some embodiments, from about 3 μm to about 15 μm.

The microporous membranes of the present invention comprise a number of components and possess membrane properties that enable the microporous membranes to be used in a variety of applications (e.g., filtration). A description of microporous membrane components and physical properties is provided below.

A. Microporous Membrane Components

The microporous membranes of the present invention comprise a number of components including, but not limited to, a polymeric spherulitic matrix material, a nucleating agent substantially uniformly dispersed throughout the polymeric spherulitic matrix material, an optional diluent also substantially uniformly dispersed throughout the polymeric matrix material, as well as other optional additives. Exemplary components for forming the microporous membranes of the present invention are provided below.

1. Polymer Matrix Material

The microporous membranes of the present invention comprise at least one polymer spherulitic matrix material. Suitable fluorinated polymers include, but are not limited to, poly(vinyl fluoride), poly(vinylidene fluoride) (PVDF), and copolymers where the majority polymer is PVDF.

In one exemplary embodiment, the microporous membrane comprises a polymer spherulitic matrix material comprising poly(vinylidene fluoride) (PVDF). PVDF is inherently chemical, UV and fire resistant, low protein binding, and electrically insulating. Therefore, the application of this thermoplastic polymer to the development of microporous films is desirable.

The PVDF utilized in the articles and process of the present invention is not limited to a single PVDF polymer. References to PVDF generally include PVDF resin, homopolymers, copolymers, and polymer blends where the majority polymer is PVDF. As used herein, "PVDF" also refers to closely related derivatives of PVDF. Examples of PVDF resins suitable for use in the present invention are commercially available from (i) Solvay Solexis (Thorofare, N.J.) under the trade designations HYLAR™ and SOLEF™ and (ii) from AtoFina Chemicals, Inc. (Philadelphia, Pa.) under the trade designation KYNAR™ (iii) 3M/Dyneon (St. Paul, Minn.) under the trade designation PVDF Homopolymers, Specialty Homopolymers or Copolymers. These PVDF resins generally have crystallinity ratios of approximately 0.3 to approximately 0.4, but the invention is not so limited. Additionally, the PVDF resin employed may vary in properties such as molecular weight and melt flow. The melt flow indices generally varied between approximately 0.13 to approximately 6.5 g/10 minutes at 230° C., 5 kg according to ASTM D1238. Although it is known that longer chains or lower melt flow may increase the strength of the resulting article, the invention is not so limited.

2. Diluent Materials

One or more diluent materials may be blended with one or more of the above-mentioned polymers. Suitable diluents include, but are not limited to, glycerol triacetate, dibutyl phthalate, and propylene carbonate. Glycerol triacetate is preferred. In addition to functioning as a diluent in TIPS processes, glycerol triacetate also has additional advantages related to its non-hazardous nature. Glycerol triacetate has been previously used as a food additive and is therefore non-toxic. The glycerol triacetate can remain in the film or be removed either partially or almost completely. Glycerol triacetate can readily be removed from microporous membranes using water as a solvent. Additionally, the by-products or effluents are glycerol and acetic acid, both of which are also non-toxic and sewerable.

There are considerable economic and environmental advantages to not requiring or producing organic solvents that must be disposed of during the removal process; therefore, glycerol triacetate is a desired diluent in the present invention. Glycerol triacetate used as a diluent in the present invention is commercially available, for example, from Eastman Kodak Company (Rochester, N.Y.) under the trade designation TRIACETIN™.

The amount of diluent used to prepare a microporous membrane of the present invention may vary depending on the membrane properties desired. Typically, the weight ratio of polymer to diluent in the present invention ranges from about 60:40 to about 30:70.

3. Nucleating Agents

The microporous membranes of the present invention are prepared via the TIPS process utilizing at least one nucleating agent. The presence of at least one nucleating agent is advantageous during the crystallization of certain polymeric materials, such as PVDF polymers, by substantially accelerating the crystallization of the polymer over that occurring when no nucleating agent is present. This in turn results in a film with a more uniform, stronger microstructure because of the presence of increased number of reduced-sized polymer domains (i.e., spherulites) that form as the polymer crystallizes from the melt. The smaller, more uniform polymer microstructure has an increased number of fibrils per unit volume and allows for greater stretchability of the materials so as to provide higher void porosity and greater tensile strength than heretofore achievable. Additional details regarding the use of nucleating agents are discussed, for example, in U.S. Pat. Nos. 6,632,850 and 4,726,989, the subject matter of which is hereby incorporated by reference in its entirety.

The nucleating agent(s) is present in an amount sufficient to initiate crystallization of the polymer at enough nucleation sites to create a polymer spherulitic matrix capable of being stretched so as to obtain a suitable microporous material. This amount can typically be less than 0.1 wt-% of the diluent/polymer mixture, and even more typically less than 0.05 wt-% of the diluent/polymer mixture. In specific implementations, the amount of nucleating agent is about 0.01 wt-% (100 ppm) to about 2 wt-% of the diluent/polymer mixture, even more typically from about 0.02 to about 1 wt-% of the diluent/polymer mixture.

Typically, the nucleating agent is selected based on the polymer being used. The nucleating agent serves the important functions of inducing crystallization of the polymer from the liquid state and enhancing the initiation of polymer crystallization sites so as to speed up the crystallization of the polymer as it cools from a molten state. Thus, the nucleating agent may be a solid at the crystallization temperature of the polymer. Because the nucleating agent increases the rate of crystallization of the polymer by providing nucleation sites, the size of the resultant polymer domains or spherulites is reduced. When one or more nucleating agents is used to form the microporous materials of the present invention, greater amounts of diluent compound can be used relative to the polymer forming the microporous materials. For example, only about a 30-40 wt % diluent level can be mixed with PVDF without a nucleating agent; however, with a nucleating agent, a diluent level of up to about 70 wt % is possible with PVDF.

It has been discovered that the use of specific nucleating agents in the TIPS process can result in microporous membranes having a relatively large average pore size, in particular, an average pore size greater than about 2.0 μm, and in some embodiments, greater than about 3.0 μm up to about 15.0 μm wherein the pores are in-between the polymer spherulites. Previously identified nucleating agents used for making PDVF TIPS membranes, for example, those listed in US 2005/0058821 A1, result in pore sizes ranging from about 0.1 microns to about 1.2 microns. One particularly useful nucleating agent comprises bicyclo[2.2.1]heptane-2,3-dicarboxylic acid, disodium salt, commercially available from Milliken & Company (Spartanburg, S.C.) under the trade designation HYPERFORM® HPN-68L.

Generally, the nucleating agent is premixed with the diluent, or alternatively, the resin prior to melt blending the mixture during the TIPS process. For example, the nucleating agent(s) in the present invention may be mixed with glycerol triacetate in a roto-shear mixer like the ULTRA TURRAX® T-25 Basic high shear mixer from IKA Works, Inc. (Wilmington, N.C.) or in a MiniZETA™ bead mill from NETZSCH USA (Exton, Pa.). Typically, the nucleating agent is premixed with the diluent for a period of time sufficient to uniformly disperse the nucleating agent throughout the diluent. Mix times typically range from about 2 to about 10 minutes depending on the volume of the diluent/nucleator blend, where 2 minutes is adequate mixing time for a batch of about 1 liter and 10 minutes for a 5 liter batch.

In other embodiments, a premixing step is not necessary to obtain a uniform dispersion of the nucleating agent within the melt blend (and the final product). For example, if an extruder assembly provides adequate mixing to uniformly distribute the nucleating agent within the polymer/diluent melt stream during extrusion (e.g., using high shear mixing elements on a twin screw extruder), the premixing step can be eliminated. However, typically, a premixing step is preferred. Creating a uniform pre-dispersion of the nucleating agent in the diluent or polymer masterbatch eliminates the need to rely on a final extrusion process as the sole mixing device.

Although many nucleating agents for use in TIPS processes are known in conjunction with the production of microporous articles, previously known nucleating agents either (1) do not extend to the production of microporous membranes made from PVDF or (2) do not result in a polymer spherulite matrix having an average pore size greater than about 2.0 microns or, in some embodiments, ranging from about 3.0 to about 15.0 microns upon stretching as little as 1.1×1.3.

4. Conventional Additives

Various additional ingredients may be included in the microporous materials of the present invention. These ingredients may be added to the polymeric blend melt, added to the material after casting, or added to the material after stretching of the material, as will be described below.

Typically, the optional ingredients are added to the polymeric blend melt, with the polymer and the diluent, as melt additives. Such melt additives include, but are not limited to, surfactants, antistatic agents, ultraviolet radiation absorbers, antioxidants, organic or inorganic colorants (e.g., dyes or pigments), stabilizers, fragrances, plasticizers, anti-microbial agents, flame retardants, antifouling compounds, and combinations thereof.

The amount of each optional ingredient is generally no more than about 15 wt-% of the polymeric blend melt, often no more than 5 wt-%, so long as the ingredient does not interfere with nucleation or the phase separation process.

B. Microporous Membrane Properties and Structural Characteristics

The microporous membranes of the present invention have structural characteristics that depend on a number of factors including, but not limited to, the materials used, adequate mixing to uniformly disperse the nucleating agent within the polymer spherulitic matrix, other TIPS process conditions of heating and quenching the melt used to form the microporous membrane, and any post-formation treatments (e.g., a heating step, a coating step, etc.) administered to the microporous membrane. A number of properties and characteristics are described below.

1. Relatively Large Pore Size

As discussed above, the microporous membranes of the present invention may have an average pore size of greater than about 2.0 μm, and typically greater than about 3.0 μm. In most embodiments, the microporous membranes of the present invention have an average pore size of from about 3.0 μm to about 15.0 μm.

The average pore size of microporous membranes of the present invention may be measured using a variety of techniques. In the present invention, average pore size may be measured in microns according to ASTM-F-316-80.

2. Layer Thickness

The microporous membranes of the present invention may have an average layer thickness that varies depending on its intended use. Typically, each microporous membrane layer ranges from about 25 microns to about 500 microns in average thickness.

3. Resistance to Fluid Flow

The microporous membranes of the present invention have a degree of resistance to fluid flow therethrough that may vary depending on its intended use, process conditions, and materials used. One method of measuring the fluid flow through a microporous membrane is to measure the resistance to gas flow through a microporous membrane as expressed as the time necessary for a given volume of gas to pass through a standard area of the microporous membrane under standard conditions as specified in ASTM D726-58, Method A, also referred to herein as "the Gurley porosity" or "the Gurley resistance to air flow." The Gurley resistance to air flow is the time in seconds for 50 cubic centimeters (cc) of air, or another specified volume, to pass through 6.35 cm$^2$ (one square inch) of the microporous membrane at a pressure of 124 mm of water.

The microporous membranes of the present invention may have a Gurley resistance to air flow of up to about 200 sec/50 cc, and typically have a Gurley resistance to air flow ranging from about 0.5 sec/50 cc to about 50 sec/50 cc.

4. Porosity

The porosity of the microporous membranes of the present invention may be represented by a calculated porosity value, $P_{cal}$, based on (i) the measured bulk density of the stretched film ($d_{sf}$) and (ii)(a) the measured bulk density of the pure polymer before stretching ($d_{pp}$) or (ii)(b) the measured bulk composite density of pure polymer plus diluent before stretching ($d_{cd}$) using the following equation:

$$P_{cal} = [1 - (d_{sf}/(d_{pp}) \text{ or } (d_{cd}))] \times 100\%.$$

II. Method of Making Microporous Membranes and Articles Containing the Same

The microporous membranes of the present invention are prepared using Thermally Induced Phase Separation or TIPS. The TIPS method generally involves melt blending a thermoplastic polymer or polymer blend with a diluent and a nucleating agent, wherein the diluent is miscible with the thermoplastic polymer or polymer blend at the melting temperature of the thermoplastic polymer or polymer blend, but phase separates on cooling below the phase separation temperature of the thermoplastic polymer or polymer blend. As used herein, the term "diluent" is meant to encompass both solid and liquid diluents. The phase separation between (i) the thermoplastic polymer or polymer blend and (ii) the diluent is liquid-solid. After the film or article is phase separated, the film or article is oriented in at least one direction to provide a network of interconnected micropores throughout. Additionally, the miscible diluent may be removed either before or after orientating or alternatively, retained in the film to facilitate filling of the pore structure. A description of the TIPS process may be found in U.S. Pat. Nos. 5,976,686; 4,726,989 and 4,539,256; and U.S. Patent Application No. 2005/0058821, the subject matter of which is hereby incorporated by reference in their entirety.

In the present invention, the TIPS process generally involves blending at least one thermoplastic polymer, a diluent and a nucleating agent to form a molten mixture of at least one thermoplastic polymer and a diluent with particulate nucleating agent substantially uniformly dispersed therein. The molten mixture is typically extruded, shaped via an extrusion die, and cast as a film (or other shape) onto a substrate, into a quench bath, or onto a casting wheel (e.g., a patterned casting wheel). Upon exiting the extrusion die, the composition begins to cool and phase separate. During cooling, the thermoplastic polymer crystallizes out of solution to cause the formation of a solid polymer spherulitic phase and a liquid diluent phase. The solid phase comprises spherulites of polymer surrounding or containing the nucleating agent held together by polymer chain tie fibrils.

After phase separation, the film-like (or other shaped) article is typically transparent and can be processed as either a "diluent-out" or a "diluent-in" product into microporous film articles. Diluent-out product is made by extracting substantially all of the diluent from the film (or other shaped article) using a volatile solvent (e.g., water). The solvent is then evaporated away leaving behind air voids where the diluent had been, thus creating a porous film (or other shaped article). To increase the air void volume, the film is then oriented or stretched in at least one direction and preferably in both the down-web (also called the longitudinal or the machine) and transverse (also called the cross-web) directions. Diluent-in films (or other shaped articles) are made by simply bypassing the extraction step and rely on orienting the film (or other shaped article) to create porosity. After orienting, if left in the film, the diluent is trapped in the amorphous portions of the polymer and the internal surfaces of the porous structure which makes the porous film (or other shaped article) dry to the touch. Previously disclosed nucleating agents used for PVDF TIPS microporous materials have not resulted in a polymer spherulitic matrix with pore sizes greater than about 2.0 microns or, in some embodiments, ranging from about 3.0 to about 15.0 microns. However, when using, for example, the HYPERFORM® HPN-68L nucleating agent in a TIPS PVDF/diluent system, membranes can now be made with a larger average pore size.

In particular, the TIPS process involves four steps: (1) melt blending to form a mixture typically comprising from about 30 to about 60 parts by weight of one or more thermoplastic polymer components, from about 40 to about 70 parts by weight of a diluent component, the diluent component being miscible with the one or more thermoplastic polymer components at a temperature above the melting temperature of the one or more thermoplastic polymer components, and up to about 2 parts by weight of a nucleating agent; (2) shaping the mixture; (3) phase separating the shaped mixture to form phase separated material, i.e., polymer regions through crystallization of the polymer component to form a network of polymer spherulite domains; and (4) creating regions of air adjacent to the material regions by extracting the diluent, stretching the polymer matrix, or both extracting and stretching to form the porous article.

The structure can be varied by manipulation of at least five process variables: (1) quench rate (i.e., time for the polymer/diluent/nucleating agent mixture to cool and phase separate), (2) type of quench, e.g., a water bath, in air, or a smooth or patterned casting wheel (3) polymer/diluent/nucleating agent weight ratios, (4) stretch ratios, (5) and/or diluent extraction.

In one exemplary embodiment, a melt blend comprising a mixture of PVDF resin, glycerol triacetate and particulate bicyclo[2.2.1]heptane-2,3-dicarboxylic acid, disodium salt nucleating agent is prepared. Various components may be pre-compounded prior to melting, for example, the optional additives described above. The term "melt blend" as used herein refers to the PVDF polymer, glycerol triacetate and nucleating agent blend, wherein at least the PVDF and glycerol triacetate are in a molten, semi-liquid or liquid state. The melt blend is prepared by mixing approximately 30 to 60 percent by weight of crystallizable PVDF thermoplastic polymer with approximately 70 to 40 percent by weight of glycerol triacetate, and additionally about 0.1 to about 1%, more particularly about 0.25 to about 1%, of the particulate bicyclo

[2.2.1]heptane-2,3-dicarboxylic acid, disodium salt nucleating agent, based on a total weight of the melt blend. Alternatively, the nucleating agent represents about 0.1 to about 2.5% by weight of the polymer. The melt blend is heated to at least the melting temperature of the PVDF and mixed to form a uniform mixture. For ease of handling the melt blend and ease in its casting, it is convenient to initiate the formation of the melt blend by heating the mixture at a temperature in a range of about 5° C. to about 100° C. above the melting temperature of the PVDF.

Exemplary microporous membranes of the present invention are prepared by casting the shaped article, such as a sheet, or layer, from the melt blend comprising the PVDF, glycerol triacetate and particulate nucleating agent. The properties of the resulting microporous membranes are dependent upon, but not limited to, the ratio of polymer to diluent in the melt blend, the type and amount of nucleating agent employed, the rate of cooling, optional extraction of the diluent, and the stretch ratio used to impart pores in-between the polymer spherulitic matrix. During cooling, heat is removed from the melt blend until the crystallization temperature of the PVDF in the melt blend is reached, and crystallization and phase separation of the PVDF can begin. Cooling temperatures between approximately 71° C. to 141° C. below the equilibrium melting point of the pure crystallizable PVDF are obtainable without process modifications with the preferred temperatures between 82° C. and 124° C. below the equilibrium melting point of the pure crystallizable PVDF.

One method is to cool the cast article in a quench bath at an appropriate temperature. Another method is to use a casting wheel where the temperature of the wheel is controlled to within the desired cooling temperature range similar to the quench bath. Typically, microporous membranes of the present invention formed using the TIPS process are cooled by casting onto a patterned roll. Alternatively, microporous TIPS membranes may be cast onto a smooth wheel. The desired performance properties would determine the preferred quenching method.

The cast films formed from the TIPS process are generally solid and transparent before the optional diluent removal and orienting. The microstructure of the cast films may be described as (i) spherulites and aggregates of spherulites comprising (a) the thermoplastic polymer (e.g., PVDF) and (b) particulate nucleating agent uniformly dispersed within the polymer spherulites with (ii) the diluent (e.g., glycerol triacetate) occupying the space between spherulites. The size of the polymer spherulites depends on, for example, the type of nucleating agent, the degree of dispersion of the nucleating agent throughout the polymer matrix, and the quench temperature. Adjacent spherulites and aggregates of thermoplastic polymer are distinct, but they have a plurality of zones of continuity. The thermoplastic polymer spherulites and aggregates are generally surrounded or coated by the diluent (e.g., glycerol triacetate), but not necessarily completely surrounded. There are areas of contact between adjacent thermoplastic polymer spherulites and aggregates where there is a continuum of thermoplastic polymer from one spherulite/aggregate to the next adjacent spherulite/aggregate in such zones of continuity.

During one or more orienting steps, the thermoplastic polymer/nucleating agent spherulites and aggregates are pulled apart, permanently attenuating the polymer in zones of continuity; thereby forming the fibrils, forming minute voids between coated spherulites and aggregates, and creating a network of interconnected micropores. As used herein, "orienting" refers to stretching beyond the elastic limit so as to introduce permanent set or elongation of the article, typically to obtain at least an increase in length of about 10% or expressed as a ratio, approximately 1.1 to 1.0. Stretching to provide an elongation of about 10% to about 300% in one or two directions is typical. The actual amount of stretching will depend upon the composition of the film and the degree of porosity (for example, average pore size) desired.

Prior to the present invention, polymeric membranes, such as those formed using the TIPS process, could be stretched to create a microporous structure. However, the polymer spherulites in polymeric membranes prior to the present invention were of a size that limited the pore size of the resulting stretched polymeric membrane. In the present invention, the polymer spherulites have a larger spherulite size, which enables the polymeric membranes of the present invention to be stretched so as to result in an average pore size of at least about 2 microns, and in some embodiments from about 3 to about 15 microns.

Stretching may be provided by any suitable device that can provide stretching in at least one direction and may provide stretching in both the machine and transverse directions. Stretching may be done sequentially or simultaneously in both directions. For example, a film may be sequentially oriented in the machine direction and subsequently in the transverse direction, or simultaneously in both the machine and transverse directions. Stretching should be done so as to obtain uniform and controlled porosity. Stretching in one direction typically causes the film to narrow or "neck" in the cross direction so stretching a film to provide an elongation of 50%, for example, does not produce a 50% increase in the surface area of the film.

Such permanent attenuation also renders the article permanently translucent. Also on orienting, if the diluent is not removed, the diluent remains coated on or surrounds, at least partially, the surfaces of the resultant thermoplastic polymer/nucleating agent particles or spherulites. Typically, the microporous films are dimensionally stabilized according to conventional well-known techniques by heating the oriented film while it is restrained at a heat-stabilizing temperature. This is also referred to annealing.

The nucleated films have a microporous structure characterized by a multiplicity of spaced (that is separated from one another), randomly dispersed, equiaxed particles of thermoplastic polymer connected by fibrils, with the nucleating agent occupying in the interior of the particles. As used herein, the term "equiaxed" means having approximately equal dimensions in all directions. If the diluent is not removed, the particle of thermoplastic polymer (e.g., PVDF) is also coated with the diluent (e.g., glycerol triacetate). Where the diluent (e.g., glycerol triacetate) is removed from the microporous film, a unique microporous sheet of thermoplastic polymer (e.g., PVDF) with nucleating agent incorporated therein remains.

The resultant microporous membrane (or film or other shaped article) may be imbibed with various materials to provide any one of a variety of specific functions thereby providing unique articles. The microporous membrane (or film or other shaped article) may be imbibed after removing the diluent (e.g., glycerol triacetate), or alternatively, the diluent (e.g., glycerol triacetate) may be left in the microporous membrane (or film or other shaped article) prior to the imbibing process. Several methods are known for imbibing microporous membrane (or film or other shaped article) including, but not limited to, multiple dipping, long soak, vacuum, hydraulic press and evaporation. Examples of imbibing materials that could be employed to at least partially fill a portion of the pores in the microporous membranes of the present invention include, but are not limited to, pharmaceuticals, fragrances, anti-microbials, antistatic agents, surfactants, pesticides, and solid particulate materials. Certain materials, such as antistatic agents or surfactants, may be imbibed without prior removal of the diluent (e.g., glycerol triacetate).

The microporous membrane (or film or other shaped article), either before or after removal of the diluent, may be further modified by depositing any one of a variety of compositions thereon using any one of a variety of known coating or deposition techniques. For example, the microporous membrane (or film or other shaped article) may be coated with metal by vapor deposition or sputtering techniques, or coated with adhesives, aqueous or solvent base coating compositions or dyes. Coating may be accomplished by conventional techniques such as roll coating, spray coating, dip coating or any other coating techniques.

The microporous membrane (or film or other shaped article) may be laminated to any one of a variety of other structures, such as other sheet materials (e.g., other microporous membranes, fabric layers (e.g., woven, non-woven, knitted, or mesh fabrics), polymeric film layers, metal foil layers, foam layers, or any combination thereof) to provide composite structures. Lamination can be accomplished by conventional techniques such as adhesive bonding, spot welding, or by other techniques that do not destroy or otherwise interfere with the porosity or create undesirable porosity or perforations.

Figure 1:
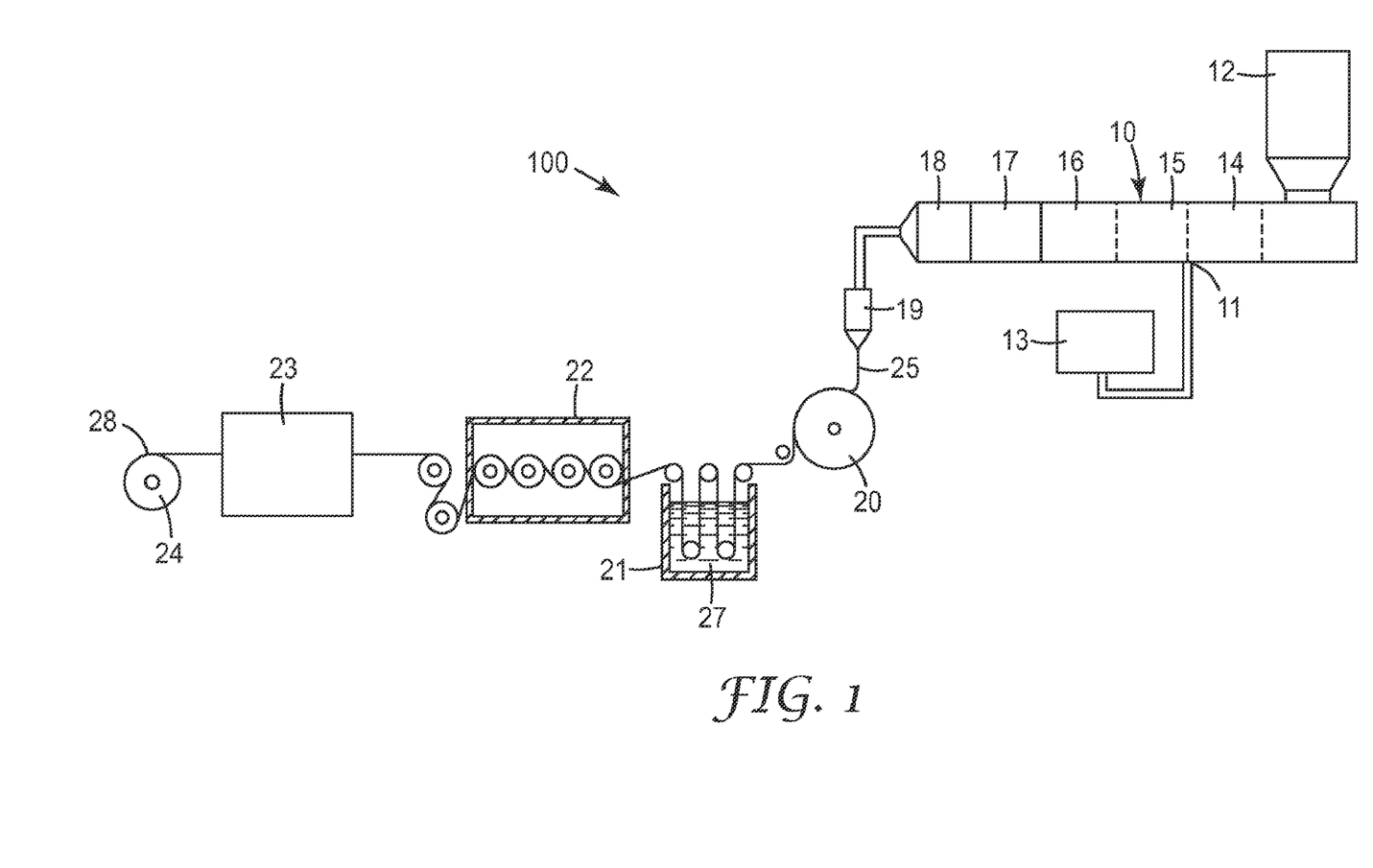
FIG. 1 depicts a schematic view of an exemplary apparatus suitable for producing microporous membranes of the present invention.

An exemplary apparatus 100 for performing the method of the present invention is shown in FIG. 1. An extruder apparatus 10 having a hopper 12 and various zones 14-16 is illustrated. Polymer is introduced into hopper 12 of extruder apparatus 10. The diluent is 13 fed into extruder 10 via a port 11 in the extruder wall between hopper 12 and an extruder exit 17. In other embodiments, port 11 may be positioned proximate hopper 12. Further, a nucleating agent may be pre-mixed with the diluent and incorporated into device 13 or fed as a polymer/nucleating agent master batch into hopper 12.

Extruder 10 desirably has at least three zones 14, 15 and 16, which are respectively heated at decreasing temperatures towards extruder exit 17. A slot die 19 having a slit gap of about 25 to about 2000 micrometers is positioned after extruder 10. A suitable mixing device, such as a static mixer 18, may be positioned between extruder exit 17 and slot die 19 to facilitate blending of the polymer/diluent/nucleating agent mixture. While passing through extruder 10, the mixture of polymer, diluent and nucleating agent is heated to a temperature at or at least about 5° C. above the melting temperature of the melt blend (i.e., the thermoplastic polymer), but below the thermal degradation temperature of the thermoplastic polymer. The mixture is mixed to form a melt blend that is extruded through slot die 19 as a layer 25 onto a quench wheel 20 maintained at a suitable temperature below the crystallization temperature of the thermoplastic polymer and the diluent.

The cooled film may then be led from quench wheel 20 to a diluent removal device 21 to expose layer 25 to a solvent 27 (e.g., water) capable of removing the diluent (e.g., glycerol triacetate). Alternatively, the cooled film may proceed directly to a machine-direction stretching device 22 and a sequentially aligned transverse-direction stretching device 23, and then to a take-up roller 24 for winding into a roll 28. Stretching in two directions as illustrated in exemplary apparatus 100 of FIG. 1 is, of course, optional. Further, simultaneous biaxial stretching in a single biaxial stretching unit (not shown) is optional in place of machine-direction stretching device 22 and transverse-direction stretching device 23.

Although not shown in exemplary apparatus 100 of FIG. 1, an in-line coating station and/or drying oven could be positioned, for example, between transverse-direction stretching device 23 and take-up roller 24 to provide a coating on one or both outer surfaces of the stretched membrane. Further, diluent removal device 21 could be positioned between transverse-direction stretching device 23 and take-up roller 24 to remove diluent after one or more stretching steps.

A further method of forming a membrane material from the blended melt includes casting the extruded melt onto a patterned chill roll to provide areas where the blend does not contact the chill roll to provide a membrane of substantially uniform thickness having a patterned surface, the patterned surface providing substantially skinless areas having high microporosity and skinned areas of reduced microporosity. Such a method is described in U.S. Pat. No. 5,120,594, the subject matter of which is hereby incorporated by reference in its entirety. The membrane material can then be oriented, i.e., stretched.

III. Methods of Using Microporous Membranes

The microporous membranes (and articles containing at least one microporous membrane) of the present invention are generally in the form of a sheet or film, although other article shapes are contemplated and may be formed. For example, the article may be in the form of a sheet, tube, filament, or hollow fiber. Microporous membranes (and articles containing at least one microporous membrane) of the present invention may be free-standing films (or other shaped articles) or may be affixed to a substrate, such as structures made from materials that are polymeric, metallic, cellulosic, ceramic, or any combination thereof, depending upon the application, such as by lamination.

The microporous membranes (and articles containing at least one microporous membrane) may be used in a variety of applications including, but not limited to, use as ion conductive membranes, separators in electrochemical cells, diffusion barriers, viral barriers, viral absorbent media, absorbent clothes, and separation media of colloidal matter. In some embodiments, the microporous membranes (and articles containing at least one microporous membrane) may have low or high binding capabilities, and may be useful in biotechnology related applications.

In other embodiments, the microporous membranes (and articles containing at least one microporous membrane) of the present invention may be used as a substrate for banknotes or other security documents due to the tendency for the microporous membranes (and articles containing at least one microporous membrane) to remain creased or folded.

Given an average pore size of up to about 15 µm, the microporous membranes (and articles containing at least one microporous membrane) of the present invention are suitable for use in a number of applications in which conventional microporous membranes (i.e., microporous membranes having an average pore size of less than about 1.5 µm) are unsuitable. For example, the microporous membranes (and articles containing at least one microporous membrane) of the present invention may be used in fuel cell applications, and for filtering large particulates like red blood cells and yeast. The microporous membranes (and articles containing at least one microporous membrane) of the present invention may also be used as pre-filters for smaller pore size media (e.g., pore size media having an average pore size less than about 2.0 µm) thereby extending the life of the smaller pore size media.

Further, the microporous membranes (and articles containing at least one microporous membrane) of the present invention are useful in the formation of smaller pore size membranes wherein particles and/or coatings are introduced into the porous structure of the microporous membranes (and articles containing at least one microporous membrane) of the present invention to impart functionality to the outer and/or interstitial surfaces of the microporous membranes (and articles containing at least one microporous membrane) of the present invention. For example, topical coatings, outer and/or interstitial surface treatments or gels may be incorporated into the microporous membranes (and articles containing at least one microporous membrane) of the present invention to impart functionality (e.g., hydrophilicity, selective low binding characteristics, or selective high binding characteristics) to the microporous membranes (and articles containing at least one microporous membrane) of the present invention. By starting with larger pore size membranes, the microporous membranes (and articles containing at least one microporous membrane) of the present invention enable processing flexibility for producing a variety of specialized, functionalized microporous membranes (and articles containing at least one microporous membrane) having an appropriate coating/interstitial filling material and still be capable of an acceptable fluid flow rate through the microporous membrane (and articles containing at least one microporous membrane). Exemplary techniques and materials for providing functionalized surfaces in the membranes of the present invention are described in U.S. patent application Ser. No. 11/611,301, Publication No. US 2007/0154703, to Waller et al., the entire disclosure of which is incorporated herein by reference thereto.

The present invention is described above and further illustrated below by way of examples, which are not to be construed in any way as imposing limitations upon the scope of the invention. On the contrary, it is to be clearly understood that resort may be had to various other embodiments, modifications, and equivalents thereof which, after reading the description herein, may suggest themselves to those skilled in the art without departing from the spirit of the present invention and/or the scope of the appended claims.

EXAMPLES

The following examples are given to show microporous materials that have been made in accordance with the present invention. However, it will be understood that the following examples are exemplary only, and are not intended to be comprehensive of the many different microporous materials which may be made in accordance with the present invention.

Materials Used:
The following materials were used in the examples:
PVDF Polymers:
  3M/Dyneon 1012 PVDF polymer, 171° C. Melt Temperature, 6.5 Melt Flow Index (3M, St. Paul, Minn.)
Diluents:
  TRIACETIN® glycerol triacetate (Eastman Kodak Co., Rochester, N.Y.) Nucleating Agents:
  HYPERFORM® HPN-68L, bicyclo[2.2.1]heptane-2,3-dicarboxylic acid, disodium salt (Milliken Chemical Co., Spartanburg, S.C.)
  Chromophthal Blue pigment, (Ciba Specialty Chemicals of Hawthorne, N.Y.)
Test Methods
The following test methods were used to characterize the films produced in the examples:
Gurley Porosity:
  Gurley is a measure of the resistance to gas flow of a membrane, expressed as the time necessary for a given volume of gas to pass through a standard area of the membrane under standard conditions, as specified in ASTM D726-58, Method A. Gurley is the time in seconds for 50 cubic centimeters (cc) of air, or another specified volume, to pass through 6.35 $cm^2$ (one square inch) of the membrane at a pressure of 124 mm of water. The film sample was clamped between cylindrical rings, the uppermost of which contained a piston and the specified volume of air, when released, the piston applied pressure, under its own weight, to the air in the upper cylinder and the time taken for the specified volume of air to pass through the membrane was measured.
Bubble Point:
  The Bubble Point pore size is the bubble point value representing the largest effective pore size measured in microns according to ASTM-F-316-80.
Water Flow Resistance:
  The Water Flow Resistance test is the measure of time in seconds it takes to pass 100 cc of deionized water through a 47 mm disc of membrane under a vacuum pressure of about 580 mm Hg. If necessary the membrane is pre-wet with alcohol to initiate wetting with water. Low values indicate high water fluxes.

Example 1

A microporous PVDF film was prepared using an apparatus similar to that shown in FIG. 1 using the method described below. With reference to FIG. 1, PVDF polymer pellets (3M/Dyneon 1012) were introduced into hopper 12 of a 40 mm twin screw extruder with a screw speed of 150 RPM. The nucleating agent (HYPERFORM® HPN-68L), in powder form, was premixed in a 2 liter batch with the glycerol triacetate diluent (TRIACETIN® glycerol triacetate) with a ULTRA TURRAX® T-25 Basic high shear mixer from IKA Works, Inc. (Wilmington, N.C.) for a period of about 5 minutes (there is only one speed for the unit) to uniformly distribute the powder in a non-agglomerated, non-gritty, smooth to the touch state and then fed, with additional diluent, by a feeding device 13 into extruder 10 via port 11. The PVDF polymer/diluent/nucleating agent weight ratio was 42.65/57.00/0.35 respectively. The total extrusion rate was about 11.3 kilograms per hour (kg/hr).

Extruder 10 had eight zones (not shown) with a temperature profile of zones 1 to 8 at 188° C., (shown in FIG. 1 as zones 14-16). The uniformly mixed polymer/diluent/nucleator melt was subsequently pumped through a double-chromed coat-hanger slot film die 19 maintained at 182 C, and cast onto patterned casting wheel 20 maintained at a wheel temperature of 71° C. at a speed of 3.0 meters per minute (m/min) to form film 25. Film 25 was washed in-line at wash station 21 in deionized water and air dried. The washed film 25 was continuously fed into a length orienter and stretched 22 at 132° C. at 1.1:1 and cross stretched in a tenter oven 23 at 132 C at 1.3:1.

Figure 2:
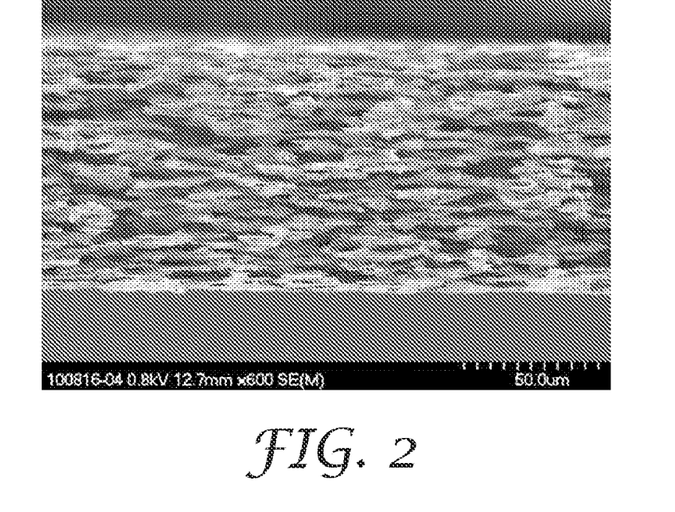
FIG. 2 depicts a cross-sectional view of an exemplary microporous membrane of the present invention.

Film samples were evaluated and found to have the following properties: an average film thickness of 0.74 mm; a bubble point pore size of 4.0 µm; a Gurley resistance to air flow of 2.5 sec/50 cc; and a resistance to water flow of 8.2 sec/100 cc. FIG. 2 provides a (SEM) photomicrograph detailing the cross-sectional configuration of the resulting film of Example 1 at a magnification of 600×.

Example 2

A microporous PVDF film was prepared using the apparatus and procedure as described in Example 1 except the PVDF polymer/diluent/nucleating agent weight ratio was 38.75/61.00/0.25 respectively. The total extrusion rate was about 13.6 kg/hr; the cast speed was 1.37 m/min; and the inline stretch ratio was 1.1×1.2 at 132° C.

Film samples were evaluated and found to have the following properties: an average film thickness of 2.2 mm; a bubble point pore size of 10.0 µm; a Gurley resistance to air flow of 0.8 sec/50 cc; and a resistance to water flow of 3.0 sec/100 cc.

Example 3

A microporous PVDF film was prepared using the apparatus and procedure as described in Example 1 except the throughput rate of all the raw materials was 13.6 kg/hr; the casting wheel temperature was maintained at 59° C.; the cast speed was 1.83 m/min; and the in-line stretch ratio was 1.35×1.35 at 132° C.

Film samples were evaluated and found to have the following properties: an average film thickness of 1.1 mm; a bubble point pore size of 2.5 µm; a Gurley resistance to air flow of 10.4 sec/50 cc; and a resistance to water flow of 17.1 sec/100 cc.

Comparative Example 1

A microporous film was prepared as Example 1 except the HPN-68L nucleating agent and the glycerol triacetate diluent 2 liter premix dispersion batch was made using a GAST Mfg. Corp. (Benton Harbor, Mich.), model 1AM-NCC-12 air motor/propeller blade mixer for 5 minutes. The dispersion was fed into the extruder as Example 1. The film, however, was found to be too weak to be handled (e.g., the film fell apart when touched) for further processing of diluent removal and film stretching. The HPN-68 powder was found to be agglomerated, gritty to the touch in the glycerol triacetate diluent because of inadequate mixing of the premix dispersion.

Comparative Example 2

A microporous PVDF film was prepared using the apparatus and procedure as described in Example 1 except 0.25 wt % of a nucleating agent, Chromophthal Blue pigment, was used instead of 0.35 wt % HYPERFORM® HPN-68L. The total extrusion rate was about 9.0 kg/hr; the cast speed was 2.0 m/min; and the stretch ratio was 1.4×1.5.

Film samples were evaluated and found to have the following properties: an average film thickness of 0.79 mm; a bubble point pore size of 0.80 µm; a Gurley resistance to air flow of 194 sec/50 cc; and a resistance to water flow of 900 sec/100 cc.

Example 4

A multi-layered film was prepared using the apparatus and procedure as described in Example 1 with the following modification. The PVDF polymer/diluent/nucleating agent composition of Example 1 was fed into top and bottom zones of a three-zoned feed block neck tube adapter at a feed rate of 11.3 kg/hr. A second extruder, in particular, a 25 mm twin screw extruder, was used to extrude the composition of Comparative Example 2 into a central zone of the three-zoned feed block neck tube adapter at a feed rate of 1.5 kg/hr.

A continuous three-layered film was cast onto a patterned casting wheel maintained at 32° C. at a cast speed of 3.0 m/min, washed in deionized water for about 20 minutes to remove the glycerol triacetate diluent, air-dried, and then stretched at a stretch ratio of 1.1×1.3 at 132° C.

Film samples were evaluated and found to have the following properties: an average film thickness of 0.79 mm; a bubble point pore size of 0.76 µm; a Gurley resistance to air flow of 38 sec/50 cc; and a resistance to water flow of 196 sec/100 cc. As expected, the central layer controlled the bubble point pore size, the Gurley resistance to air flow, and the resistance to water flow properties of the resulting three-layered film.

Figure 3:
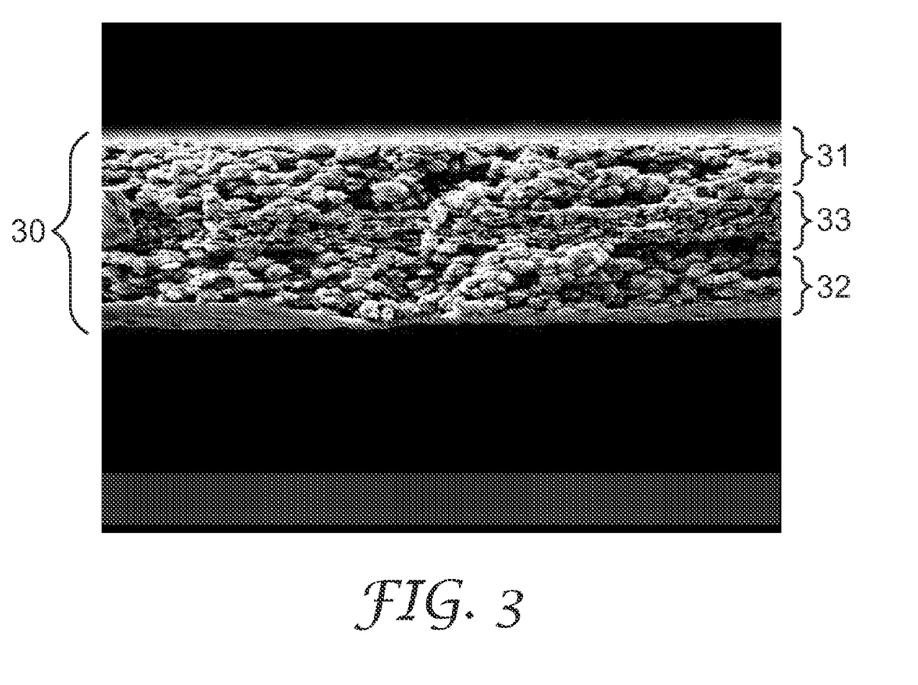
FIG. 3 depicts a cross-sectional view of an exemplary multi-layer microporous membrane of the present invention.

FIG. 3 provides a (SEM) photomicrograph detailing the cross-sectional configuration of the resulting three-layered film of Example 3 at a magnification of 1000×. As shown in FIG. 3, outer layers 31 and 32 of film 30 possessed a larger pore size than central layer 33, which controlled the overall porosity of film 30.

Example 5

A continuous roll of microporous PVDF film was prepared using the apparatus and procedure as described in Example 1 except the PVDF polymer/diluent/nucleating agent weight ratio was 39.85/60.00/0.15 respectively. The total extrusion rate was about 13.6 kg/hr; the cast speed was 1.6 m/min; the film die was maintained at 166° C.; and the inline film stretch ratio was 1.6×2.2 at 132° C.

The roll of membrane was evaluated and found to have the following properties: an average film thickness of 1.17 mm; a bubble point pore size of 11.8 µm; a Gurley resistance to air flow of 0.4 sec/50 cc; and a resistance to water flow of 1.4 sec/100 cc.

Figure 4:
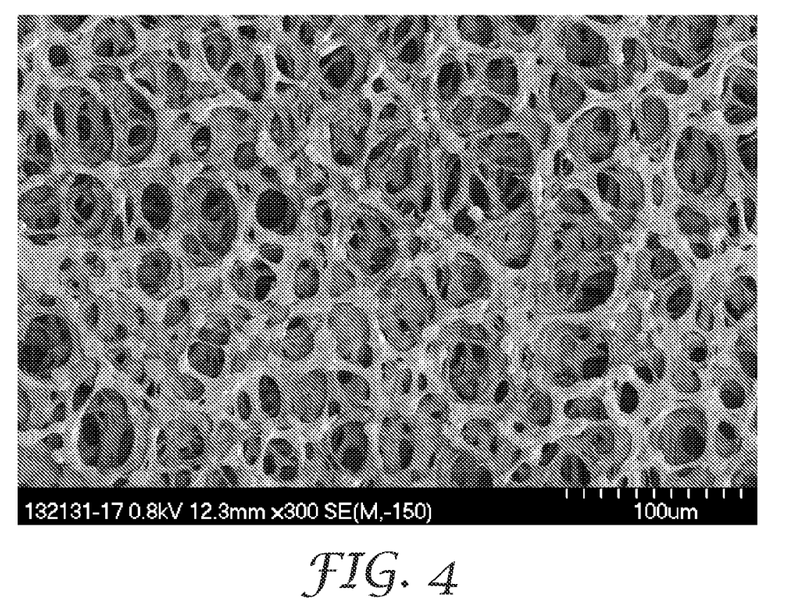
FIG. 4 depicts a surface view of an exemplary microporous membrane of the present invention.
Figure 5:
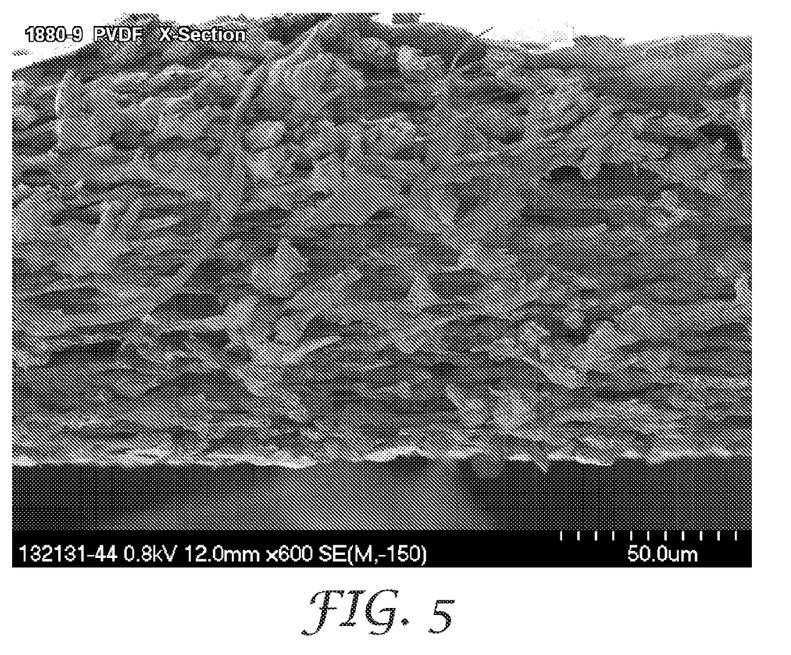
FIG. 5 depicts a cross-sectional view of an exemplary multi-layer microporous membrane of the present invention.

FIG. 4 provides a (SEM) photomicrograph detailing the surface of the air quenched side of the PVDF film of Example 5 at a magnification of 300×. FIG. 5 provides a (SEM) photomicrograph detailing the cross-sectional configuration of the film of Example 5 at a magnification of 600×.

While the specification has been described in detail with respect to specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. A microporous membrane comprising:
a first layer comprising a poly(vinylidene fluoride) polymeric matrix and a nucleating agent substantially uniformly dispersed throughout the polymeric matrix, said nucleating agent comprising bicyclo[2.2.1]heptane-2,3-dicarboxylic acid, disodium salt, wherein said first layer has a substantially uniform distribution of pores therein, said pores having an average pore size greater than about 2.0 µm.

2. The microporous membrane of claim 1, wherein the polymeric matrix comprises polymer spherulites and the nucleating agent is present within the polymer spherulites of the polymer matrix.

3. The microporous membrane of claim 1, wherein the microporous membrane comprises a thermally-induced phase separation (TIPS) membrane.

4. The microporous membrane of claim 1, wherein said pores have an average pore size ranging from about 3.0 µm to about 15.0 µm.

5. The microporous membrane of claim 1, wherein said pores have an average pore size ranging from about 6.0 µm to about 15.0 µm.

6. The microporous membrane of claim 1, wherein said first layer further comprises a diluent.

7. The microporous membrane of claim 6, wherein said diluent comprises glycerol triacetate.

8. The microporous membrane of claim 1, further comprising a second layer on at least one major outer surface of said first layer, said second layer comprising a polymeric matrix having a substantially uniform distribution of pores therein, said pores in said second layer having an average pore size ranging from about 0.05 µm to about 15.0 µm.

9. The microporous membrane of claim 8, wherein the first layer comprises pores having an average pore size greater than an average pore size of pores within the second layer.

10. The microporous membrane of claim 1, further comprising a second layer on at least one major outer surface of said first layer, said second layer comprising an adhesive layer, a coating composition, a woven layer, a nonwoven layer, a knitted layer, a mesh fabric layer, a polymeric film layer, a metal foil layer, a foam layer, or any combination thereof.

11. The microporous membrane of claim 1, further comprising an imbibing material within at least a portion of the pores.

12. A microporous membrane comprising:
a first layer comprising a poly(vinylidene fluoride) polymeric matrix and a nucleating agent substantially uniformly dispersed throughout the poly(vinylidene fluoride) polymeric matrix, said nucleating agent comprising bicyclo[2.2.1]heptane-2,3-dicarboxylic acid, disodium salt, wherein said first layer has a substantially uniform distribution of first layer pores therein, said first layer pores having an average pore size greater than about 2.0 µm; and
a second layer on at least one major outer surface of said first layer, said second layer comprising a second polymeric matrix having a substantially uniform distribution of second layer pores therein, said second layer pores having an average pore size less than said first layer pores and ranging from about 0.05 µm to less than about 15.0 µm.

13. The microporous membrane of claim 12, wherein the polymeric matrix comprises polymer spherulites and the nucleating agent is present within the polymer spherulites of the polymer matrix.

14. The microporous membrane of claim 12, wherein the microporous membrane comprises a thermally-induced phase separation (TIPS) membrane.

15. The microporous membrane of claim 12, further comprising an imbibing material within at least a portion of the first layer pores.

16. A method of making a microporous membrane, the method comprising the steps of:
forming a first layer comprising a poly(vinylidene fluoride) polymeric matrix, a diluent, and a nucleating agent substantially uniformly dispersed throughout the polymeric matrix, the nucleating agent comprising bicyclo[2.2.1]heptane-2,3-dicarboxylic acid, disodium salt;
optionally removing the diluent; and
stretching the first layer in at least one direction,
wherein the method results in a microporous membrane having a substantially uniform distribution of pores therein with an average pore size greater than about 2.0 µm.

17. The method of claim 16, wherein said forming step comprises an extrusion step.

18. The method of claim 16, wherein said forming step comprises a thermally-induced phase separation (TIPS) step.

19. The method of claim 16, wherein the method comprises said removing step, and said removing step comprises washing the first layer to remove the diluent.

20. The method of claim 16, further comprising:
forming a second layer on at least one major outer surface of the first layer, the second layer comprising a polymeric matrix having a substantially uniform distribution of pores therein with an average pore size ranging from about 0.05 µm to about 15.0 µm.

21. The method of claim 20, wherein the first and second layers are formed during a co-extrusion step.

22. The method of claim 20, wherein the first layer comprises pores having an average pore size greater than an average pore size of pores within the second layer.

* * * * *

UNITED STATES PATENT AND TRADEMARK OFFICE
CERTIFICATE OF CORRECTION

PATENT NO. : 8,182,908 B2  Page 1 of 1
APPLICATION NO. : 12/680592
DATED : May 22, 2012
INVENTOR(S) : James S. Mrozinski It is certified that error appears in the above-identified patent and that said Letters Patent is hereby corrected as shown below:

Column 4
Line 46, delete "sewerable" and insert --severable--

Column 13
Line 58, delete "Chromophthal" and insert --Cromophtal--

Column 14
Line 46, delete "182 C" and insert --182°C--
Line 53, delete "132 C" and insert --132°C--

Column 15
Line 42, delete "Chromophthal" and insert --Cromophtal--

Signed and Sealed this
Fourteenth Day of August, 2012

David J. Kappos
*Director of the United States Patent and Trademark Office*